United States Patent Office 3,561,216
Patented Feb. 9, 1971

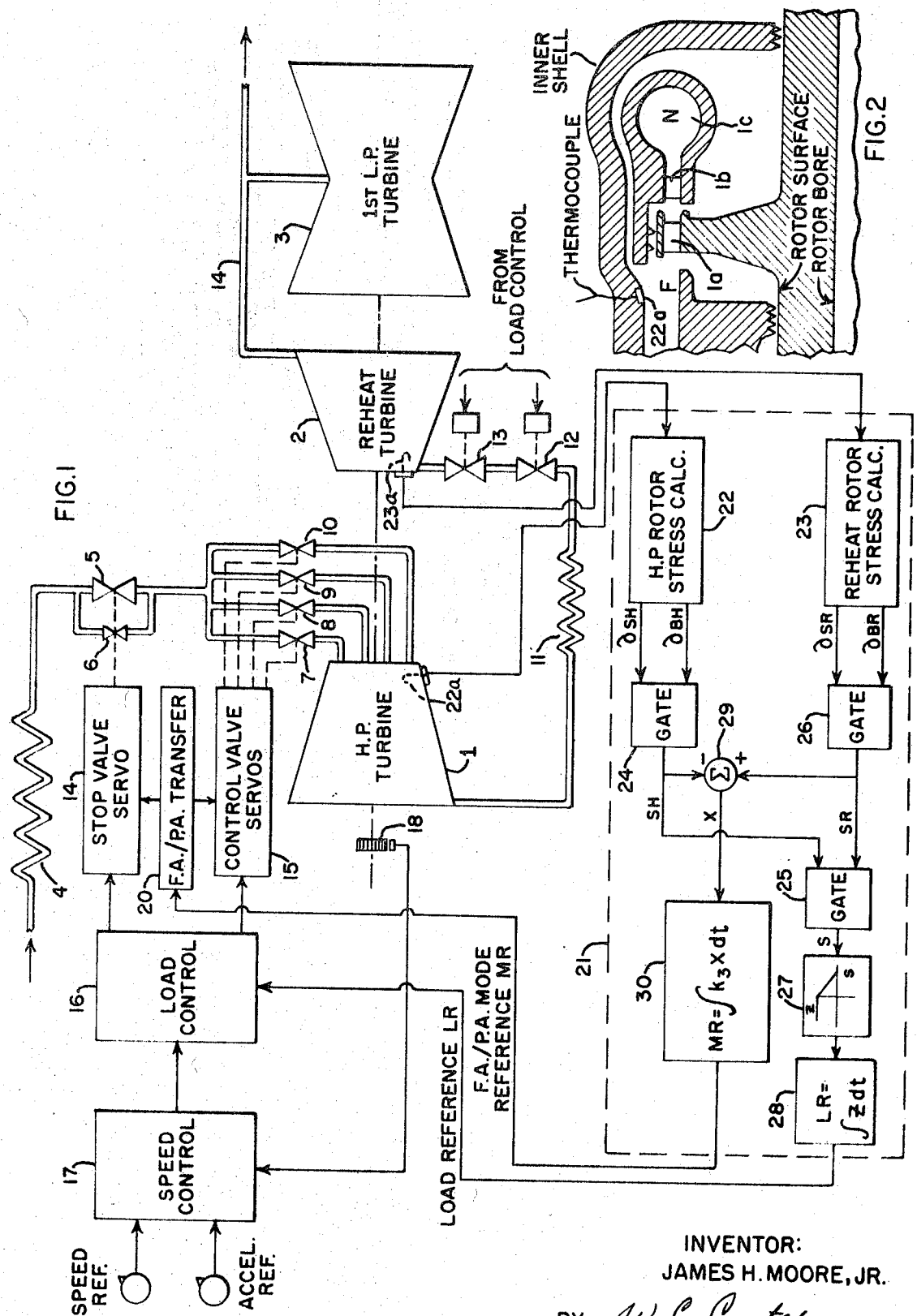

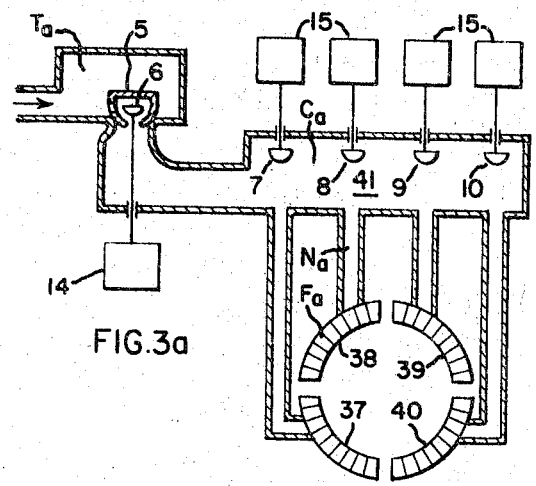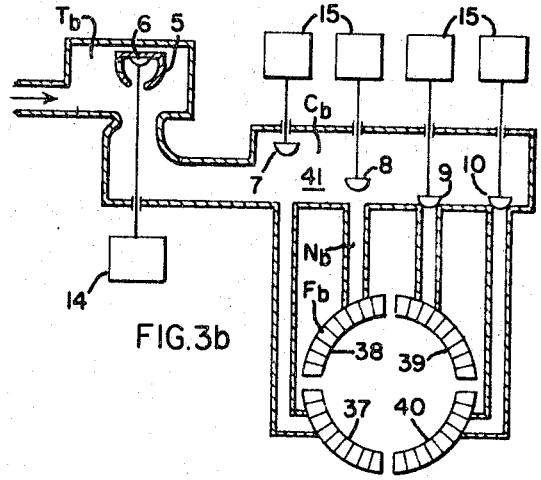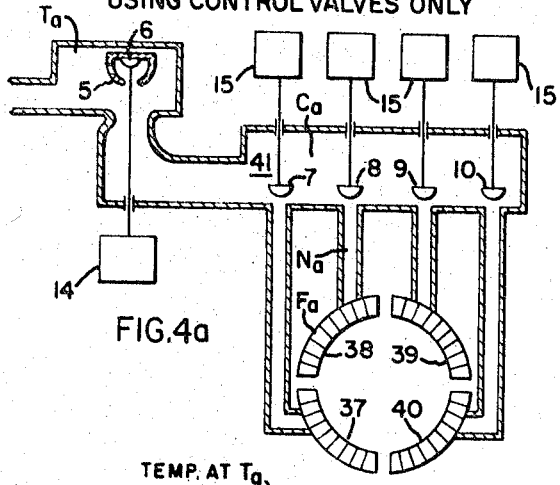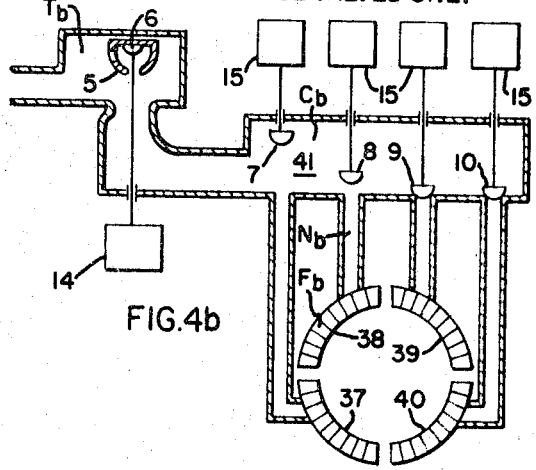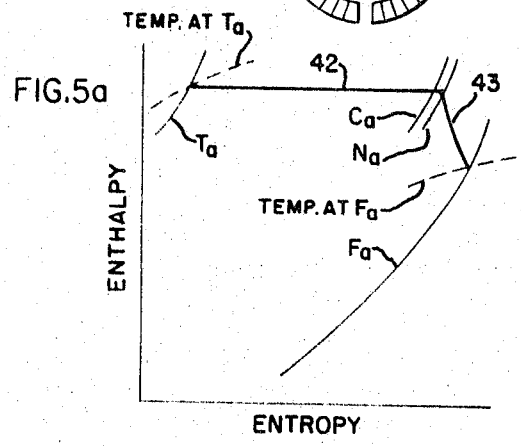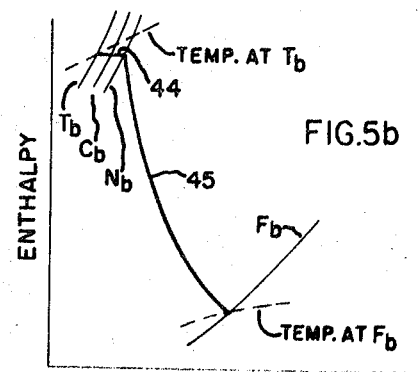

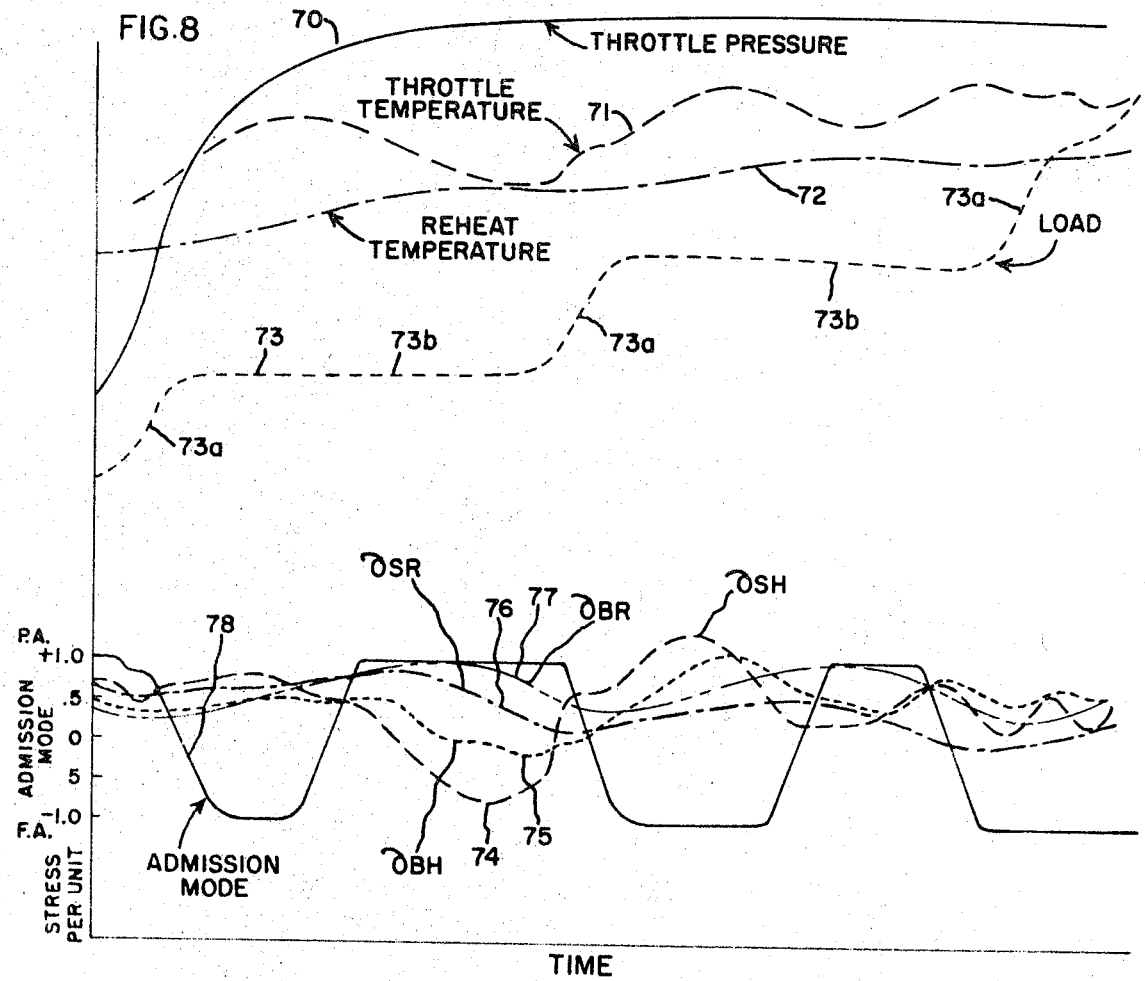
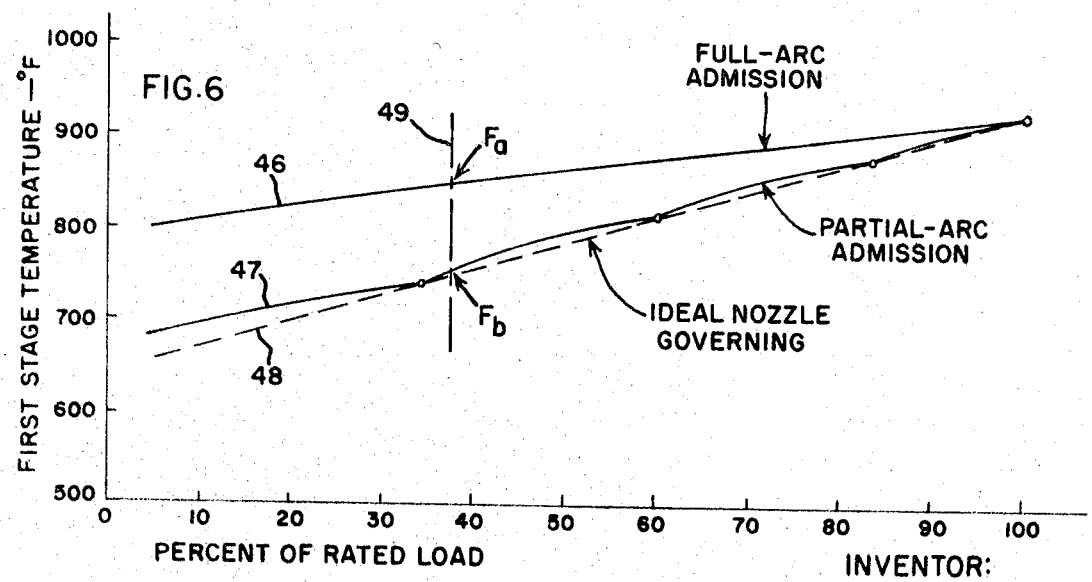

3,561,216
THERMAL STRESS CONTROLLED LOADING OF STEAM TURBINE-GENERATORS
James H. Moore, Jr., Schenectady, N.Y., assignor to General Electric Company, a corporation of New York
Filed Mar. 19, 1969, Ser. No. 808,572
Int. Cl. F01k 7/24
U.S. Cl. 60—73
7 Claims

ABSTRACT OF THE DISCLOSURE

In a steam turbine-generator with means for setting load in accordance with a load reference signal and with additional means for transferring between full arc and partial arc mode of steam admission, the rotor stresses are continuously calculated and set the rate of loading the steam turbine. The type of steam nozzle admission between full arc and partial arc is additionally controlled in accordance with a mode reference signal so as to minimize the thermal stress differences between high pressure and reheat rotors in order to reduce the turbine loading time.

BACKGROUND OF THE INVENTION

This invention relates to the rapid loading and unloading of steam turbine-generators in accordance with calculated rotor thermal stresses in a manner to minimize the time required to make a load change.

Startup and loading of a large steam turbine-generator has become more involved in recent years, as the trend toward larger units results in higher thermal stresses for any given temperature transient. Two factors contribute to thermal stresses during startup. Initially, a mis-match exists between the temperature of the admitted steam and the metal temperature and the degree of mis-match depends upon the past operating history, i.e., whether or not the turbine is involved in a cold start or a hot start. The mis-match is essentially corrected during the acceleration phase of the startup.

Secondly, when the turbine-generator is producing load and steam flow is high enough so that any substantial mis-match cannot exist, metal temperature will follow steam temperatures closely. Control of metal temperatures and therefore thermal stresses is based primarily on analytical and statistical correlation between stress levels and expected rotor life.

Traditionally, charts and graphs have been provided to allow the operator to reduce the mis-match at a safe rate during the acceleration phase of the startup and to determine allowable rates of change of metal temperature during the loading procedure. Various techniques have been employed to speed up the process of loading the turbine, including heat soaking periods on "turning gear" to reduce the initial mis-match. Initial operation in the less efficient "full arc" steam admission mode has been used to achieve uniform warming of the high pressure turbine inlet parts.

There have been suggestions in the published prior art of starting up steam turbines using various techniques such as acceleration control, load control, etc. in an effort to minimize startup time without damaging the turbine. These systems are usually predicated on ideal boiler conditions. Since turbine startups can take several hours, systems which will reduce these times, as well as allow for fluctuations in steam temperature and pressure from the boiler, are of great value.

A sophisticated approach to startup and loading control by means of continuously calculating rotor surface and bore stresses from speed and temperature measurements, and then loading at a maximum permissible stress, is described in U.S. Pat. 3,446,224 issued on May 27, 1969 to E. E. Zwicky, Jr. and assigned to the present assignee. Although the Zwicky patent is useful for achieving rapid startup and loading, even faster startup and loading would be possible through better thermal stress distribution among various parts of the different turbine sections relative to their designed capabilities.

Accordingly, one object of the present invention is to provide an improved stress controlled turbine startup and loading system.

Another object of the invention is to provide an improved method for loading a steam turbine in the minimum time without overstressing the rotors or other turbine parts.

DRAWING

These and other objects of the invention will be seen by refernce to the description, taken in connection with the accompanying drawing, in which:

FIG. 1 is a simplified schematic diagram of a control system for carrying out the invention, FIG. 2 is a typical high pressure turbine first stage cross-section in simplified form.

FIGS. 3a and 3b are simplified schematic diagrams illustrating one mode of carrying out the invention using a stop valve bypass.

FIGS. 4a and 4b are similar views illustrating another mode of carrying out the invention using control valves only.

FIGS. 5a and 5b are Mollier diagrams showing steam conditions for either of the FIG. 3 or FIG. 4 arrangements.

FIG. 6 is a graph of load vs. temperature under both full arc and partial arc conditions.

FIG. 8 is composite graph of several variable versus time showing a turbine startup under severe operating conditions.

SUMMARY OF THE INVENTION

Figure 7:
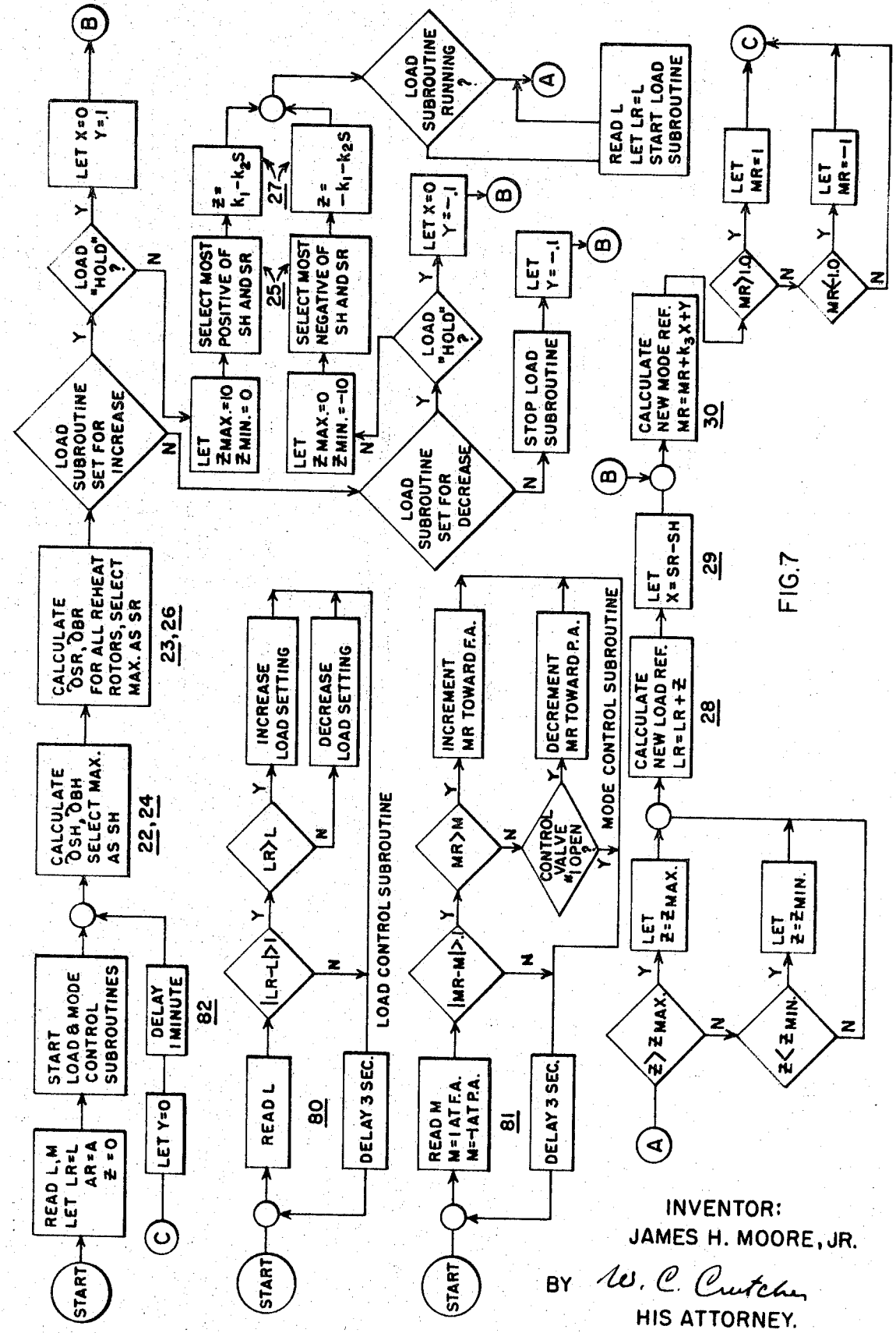
FIG. 7 is a flow chart showing implementation of the startup in a digital computer.

Briefly stated, the invention is practiced by means of a load/mode controller which provides a load setting signal and also a mode signal for adjusting the steam admission mode. The controller calculates stress signals representing maximum allowable stress, one of which is responsive both to load and to mode, another of which is responsive primarily to load. The load is adjusted in accordance with the higher of these stresses, while the mode is adjusted in accordance with the difference beween these stresses, so as to minimize time required to change load.

DESCRIPTION OF THE INVENTION

Referring to FIG. 1 of the drawing, a schematic diagram shows portions of a reheat steam turbine, its normal speed and load control system, and an automatic stress-controlled loading system depicted in functional diagrammatic form. It will be understood by those skilled in the art that a large steam turbine-generator control and supervisory system is a very complex affair, and hence only the portions which are material to the present invention are shown here.

Portions of the turbine shown include a high pressure turbine 1, reheat turbine 2, and one of the double-flow low pressure turbines 3, all arranged in tandem. The number and arrangement of additional low pressure turbines, or perhaps additional reheat turbines, as well as the number and arrangement of generators, are not important to an understanding of the invetion. The steam flow is form a boiler 4 through main stop valves 5 with built-in bypass valves 6, and then through control valves 7, 8, 9, 10, each of the latter connected to a different nozzle arc supplying the first stage or high pressure rotor blades. Steam from the high pressure turbine 1 is reheated in reheater 11, flows through reheat stop valves 12 and intercept valves 13 to the reheat turbine 2, and thence through suitable crossover conduits 14 to the low pressure turbines.

The admission of steam is controlled through a stop valve servo mechanism 14, and a number of control valve servo mechanisms shown collectively as 15 and operating the respective valves as indicated by dotted lines. The servo mechanisms may be of the electrohydraulic type driving high pressure hydraulic rams in response to electrical signals as illustrated in U.S. Pat. 3,403,892 issued to M. A. Eggenberger et al. on Oct. 1, 1968 and assigned to the present assignee.

The servo mechanism 14, 15 are both under the control of a load control unit 16 which provides as its output a suitable valve positioning signal corresponding to a desired rate of steam flow. The remainder of the primary control loop includes a speed control unit 17 which receives a speed signal in the form of digital pulses from a toothed wheel 18 on the turbine shaft.

As is known to those skilled in the art, the various valves 5–10 may be manipulated in such a way as to either admit steam uniformly through all of the nozzle arc disposed around the first stage inlet of the turbine, otherwise known as "full arc" admission; or else the control valves 7–10 can be manipulated in sequence in a thermodynamically more efficient mode to one nozzle arc at a time, this being known as "partial arc" admission.

A mechanism to transfer back and forth between full arc and partial arc mode, as well as to indicate the degree of transfer which has taken place, is shown schematically as a transfer device 20. One type of transfer mechanism which employs an internal stop valve bypass such as 6, to throttle the steam during full arc admission, is completely described in U.S. Pat. 3,097,489 to Eggenberger et al. issued July 16, 1963 and assigned to the present assignee, said patent being incorporated by reference herein.

Another type of transfer mechanism which uses only the control valves to throttle the steam during full arc admission by operating in unison is seen in U.S. Pat. 3,403,892 issued to Eggenberger et al. on Oct. 1, 1968 and assigned to the present assignee, said patent being incorporated by reference herein.

It is immaterial, in so far as the present invention is concerned, whether the steam during full arc admission is throttled by a stop valve bypass or by the control valves, or by combination of them, as long as there are means provided to shift back and forth between the full arc and partial arc mode, and to position or control the valves at any intermediate point in the transfer.

Shown also in FIG. 1 is an automatic load/mode control system 21 within the dashed line. This may be a special purpose or wired logic control device, either digital or analog in nature, or it may be equally well accomplished in a digital computer programmed with instructions to carry out the indicated functions.

One input to the load/mode controller is the first stage metal temperature sensed by a thermocouple 22a disposed at the inner casing of the double casing, high pressure turbine and sensing the metal temperature at a point exposed to the steam after it has passed through the stationary first stage nozzles and the first stage rotor blades. The other input is reheat turbine inlet metal temperature sensed by a thermocoupled 23a the reheat turbine inlet. These two points experience the greatest temperature changes in the turbine during startup and loading.

FIG. 2 shows a typical first stage cross-section of high pressure turbine 1. The rotor blades are shown at 1a and the nozzles at 1b. Steam is introduced through the casings into a nozzle inlet chamber 1c. The steam expands from a temperature and pressure condition indicated as N to a first stage temperature and pressure condition indicated as F. The transducer 22a follows the steam temperature at F.

Returning to the FIG. 1 description, outputs from the load/mode controller are a "load reference" signal indicating a desired rate of steam flow to produce this load, and a "mode reference" signal supplied to the full arc/partial arc tarnsfer device 20 indicating a desired relative point between full arc and partial arc steam admissions to the first stage.

The load/mode controller 21 uses first stage shell temperature from thermocouple 22a to calculate at location 22 both the rotor surface stress $\partial SH$ and the rotor bore stress $\partial BH$ (see FIG. 2) and, similarly, the surface stress $\partial SR$ and bore stress $\partial BR$ in the reheat rotor are calculated at 23. If there are additional reheat rotors, their stresses are also calculated at 23. Since the rotor is assumed to be at rated speed, only the thermal stresses are affected by load changes and need be considered. Digital and analog means for calculating the aforesaid rotor stresses in a stress-controlled startup system are fully described in aforementioned application, Ser. No. 606,843, now U.S. Pat. 3,446,224 issued to E. E. Zwicky and assigned to the present assignee, said patent being incorporated by reference herein.

In order to relate the stresses in the different rotors (having different materials with different allowable stresses) to a common ground for comparison, the stresses are "normalized" by dividing the actual stress by "allowable" stress for each particular material and location as part of the computation. By convention, stresses resulting from an increasing temperature are calculated as positive quantities, and stresses due to a decreasing temperature are calculated as negative.

The high pressure rotor surface and bore stresses are compared in a gating device 24, and the higher of these in absolute value, indicating the greatest stress SH in the high pressure turbine rotor, is gated and applied to a second gating device 25. Similarly, the highest of the reheat rotor surface and bore stresses SR is gated at 26 and also applied to gating device 25. Next, for load increases, the more positive stress S of the high pressure and reheat rotors is then gated at 25 and applied to a device or subjected to a calculation represented by function 27 and integration 28. For control of load reduction, gating device 25 is changed to pass the more negative stress and function 27 is changed to produce a negative rate. A suitable switch on the control console allows the operator to select load increase or reduction as required.

A load reference signal LR is thereby produced which will cause steam flow through the valves to load or unload the turbines under control of the highest stress of all of the various thermal stresses.

The foregoing method of loading the turbine under the control of the highest of several calculated stresses is similar to the aforedescribed Zwicky patent. However, in accordance with the present invention, the high pressure rotor stress SH and reheat rotor stress SR are compared with one another in a summing device 29 with the appropriate sign convention, and the difference signal X is applied to a device or subjected to a calculation indicated as integration 30, which produces a mode reference signal MR. Signal MR is applied to the transfer device 20 and indicates the relative point between full arc and partial arc at which the valves are to be positioned. The absolute value of mode reference signal is unimportant and the convention selected here is that MR varies between $-1.0$ at partial arc to $+1.0$ at full arc.

Reference to FIGS. 3a and 3b show the two extreme positions between full arc in FIG. 3a and partial arc in FIG. 3b when the stop valve bypass 6 is used. Each of the control valves 7–10 supplies a separate nozzle arc 37–40 respectively. In FIG. 3a, steam is throttled from throttle pressure $T_a$ through stop valve bypass 6 into the steam chest 41 at chest pressure $C_a$. There is further reduction to steam nozzle inlet pressure indicated at $N_a$. Subsequently, the steam expands through the first stage nozzle and first stage turbine blades to first stage pressure $F_a$, doing work and dropping moderately in temperature.

Referring to FIG. 3b, the partial arc condition is shown, wherein the stop valve 5 and its bypass 6 are open. The first control valve 7 is wide open admitting steam to nozzle arc 37, while control valve 8 is partially open admitting reduced flow of stem to nozzle arc 38. Valves 9 and 10 are closed so that nozzle arcs 39, 40 are blocked off.

Reference to FIGS. 5a and 5b show the respective Mollier diagrams for the expansion process from inlet to first stage conditions for the full arc and partial arc conditions of FIGS. 3a and 3b respectively., It is to be particularly noted that, while the admission mode is different, the total steam flow (hence load) is substantially the same. FIG. 5a shows a constant enthalpy process from the steam admission point to the nozzle inlets, as indicated by line segment 42 and a subsequent expansion process through the first stage in full arc mode as indicated by line segment 43. The pressures and temperatures indicated on the Mollier chart correspond to the locations on the physical schematic diagram.

In FIG. 5b, throttling losses through the stop valves are reduced as indicated by constant enthalpy line segment 44 with a subsequent high extraction of energy and substantial reduction in temperature in expanding to first stage pressure $F_b$ indicated by line segment 45.

The point to be noted in comparison of Mollier diagrams of FIGS. 5a and 5b is that the first stage temperature at $F_b$ is substantially lower than the first stage temperature at $F_a$ under the two different admission modes.

Reference to FIG. 6 of the drawing illustrates that this first stage temperature difference exists over practically the entire range of rated load, being maximum at no load, and converging to an identical temperature at full load. At full load, there is no distinction between full arc and partial arc modes.

In FIG. 6, the top line segment 46 (full arc) shows a gradually increasing first stage temperature with increase in load. Below, the connected arcuate line segments 47 (partial arc) show a more pronounced increase in temperature with increase in load but commencing at a lower temperature. The discontinuities indicate the points where each of the four control valves commence to open. Theoretical operation with an infinite number of valves is indicated by the dashed line 48. (FIG. 5b is also drawn assuming an infinite number of control valves.)

The vertical line 49 on FIG. 6 indicates that a point $F_a$ on full arc admission, a high first stage temperature is obtained, while at the same load at point $F_b$ on partial arc admission, a much lower first stage temperature is obtained.

Contrary to the teachings of the prior art, wherein governing was to take place either at full arc or at partial arc, the present invention contemplates continuous controlling between full and partial arc or at any intermediate point during transient operation in order to control first stage temperature to optimize the turbine stress conditions. During constant load operation, control is gradually returned to the more efficient partial arc admission.

Any type of controlled transfer between full arc and partial arc is suitable for practicing the invention. Reference to FIGS. 4a and 4b show another type of full arc and partial arc admission mode control using the control valves alone, as more fully set forth in U.S. Pat. 3,403,892 referred to previously. The stop valve 5 and its bypass 6 are fully open in both cases. In FIG. 4a, valves 7, 8, 9, 10 are positioned in unison to admit steam to nozzle arcs 38–40 respectively. In FIG. 4b, the situation is the same as previously described in connection with FIG. 3b above. It is important to note that, with the exception of the chest pressure $C_a$ which does not affect the end results, the Mollier diagrams FIG. 5a, FIG. 5b apply equally in the case of FIGS. 3 or FIGS. 4.

The various functions indicated within the automatic control block 21 can be carried out by suitable hardware selected to carry out the indicated functions, or the functions can also be programmed as instructions to a digital computer. Illustrated in FIG. 7 is a flow chart for programming a computer to accomplish the stress controlled loading in accordance with the present invention. Table I set forth below gives definitions for the symbols used in the flow chart:

L=Actual electrical load expressed as percent of rated load.
M=Actual admission mode expressed in arbitrary values of −1 for partial arc and +1 for full arc.
LR=Load reference or desired load setting in percent of rated load.
MR=Mode references or desired admission mode.
SH=Largest in magnitude or absolute value per unit thermal stress calculated from the surface and bore stresses of the high pressure turbine rotor.
SR=Largest in magnitude or absolute value per unit thermal stress calculated from the surface and bore stresses of all of the reheat turbine rotors.
X=Difference between maximum thermal stresses of the high pressure and reheat rotors.
Y=Mode bias causing gradual trimming toward partial arc admission.
Z=Selected rate of change of load expressed in percent per minute.
$Z_{max}$=Maximum rate of change of load limit.
$Z_{min}$=Minimum rate of change of load limit.
$K_1$, $K_2$, $K_3$=Constants selected according to turbine characteristics.

Referring to FIG. 7, a load control subroutine is shown at 80. This operates by sampling actual load L at intervals, comparing it to the load reference LR and increasing or decreasing the load called for by the normal load control unit of the turbine in increments or decrements.

A mode control subroutine 81 is very similar and is employed to sample the admission mode indicated by the transfer device 20, compare it with the mode reference MR and to adjust the relative valve openings at the desired mode point.

Wherever possible, the functions indicated within the controller block 21 in FIG. 1 are designated with the same reference numerals in the flow chart in FIG. 7. The stress calculations and initial stress gating routines are not shown in detail, inasmuch as they are substantially described in the aforesaid Zwicky patent.

The allowable rate of load increase Z, expressed in percent per minute, is calculated at 27 and is indicated by the slope of the function in the corresponding box 27 in FIG. 1.

The integrations indicated at 28, 30 in FIG. 1 are designated with the same numbers in FIG. 7, coupled with the effect of a delay of one minute between each calculation as indicated at 82.

The comparison between maximum high pressure rotor stress and reheat rotor stress to obtain the difference therebetween is shown at reference 29 in both FIGS. 1 and 7.

It can be seen in FIG. 7 that provision has been made for the operator to interrupt a load change by specifying a hold condition. When this is the case, the admission mode is removed from stress control by setting X=0 and slowly moved by bias Y to the most advantageous position to subsequently resume the load change. This procedure serves to continue the temperature change in the first stage during the hold and permits a greater loading rate when loading is resumed.

Another variation of the invention is shown in FIG. 7 wherein the loading subroutine is stopped when neither increase nor decrease is selected, but wherein admission mode control remains operative in case of a load change by the speed governor in the event of a disturbance in system frequency. In this case, bias Y is given a small value that will return control to partial arc admission in the steady state.

Writing instructions to carry out a program in accordance with the FIG. 7 flow chart is well within the scope of those skilled in the art.

OPERATION

The operation of the invention under a startup condition is depicted in the composite graph of FIG. 8, wherein startup time is plotted against a relative scale of variables. Contrary to control systems depicted in the prior art, wherein assumptions are made that reheat steam temperature and throttle steam temperature and pressure are constant or follow predictable patterns, FIG. 8 depicts variable inlet steam conditions whose only predictable pattern is a general trend to increase with load. Throttle pressure is shown by line 70, steam throttle temperature by line 71 and reheat steam temperature by line 72. Load is applied as indicated by the load curve 73.

The four calculated rotor stresses, indicated as outputs from boxes 22, 23 in FIG. 1, are shown on the bottom portion of the graph. These include the high pressure rotor surface stress 74, the high pressure rotor bore stress 75, the reheat rotor surface stress 76, and the reheat rotor bore stress 77. As described previously, the maximum stress at any one time (or the highest of the four stress lines on the graph) is acting to set the loading rate for the turbine.

In accordance with the present invention, the admission mode is continuously controlled between full arc and partial arc as indicated at line 78. Contrary to the prior art, wherein only one transfer is made from full arc to partial arc during loading, it is seen that under the present invention, mode control is transferred back and forth between full arc and partial arc. Stresses in the high pressure rotor have no effect on the loading rate during intervals of time when the reheat rotor stress is the greater and determining the loading rate. Therefore, the admission mode reference may be moved by the controller to increase the rate of temperature change and therefore the stress in the high pressure rotor.

During intervals of time in which the high pressure rotor stress is greater, the loading rate is dependent entirely on the high pressure rotor stress. The overall rate of loading can be increased by moving the admission mode reference so as to reduce the rate of first stage temperature change, hence, stress in the high pressure rotor. Since the total temperature change for both rotors depends only on the initial and final load points, the overall temperature change is the same for any method of control. However, under the present invention, the admission mode is used to control the temperature of the high pressure rotor independently of the reheat rotor, while the rate of loading is affecting either or both rotor temperatures. Therefore, the time required to perform the change in load can be less than that of existing methods given the same maximum stress level.

Stated in another way, the stress signals calculated for both the high pressure rotor and the reheat rotor are responsive to temperature changes, which depend upon load changes. However, the high pressure stress signal is also dependent upon mode of steam admission, while the reheat stress signal is not. The turbine is loaded according to the higher of these two signals. When the high pressure signal is highest, the mode is adjusted toward partial arc to reduce high pressure stress (despite the fact that load is being added in accordance with high pressure stress). When the reheat signal is highest, it is determining additions of load. However, the high pressure rotor temperature is not being increased as fast as it could within allowable stress limits. Therefore, even though the mode adjustment cannot affect reheat stress directly, it is adjusted toward full arc in order to increase the rate of temperature change for the high pressure rotor.

The invention is not limited to rotor stresses alone but comprehends casing stresses as well. For example, the higher of the allowable high pressure rotor or high pressure casing stresses may be used to supply the high pressure stress signal. Similarly, the higher of reheat rotor or reheat casing stresses may supply the reheat stress signal. This would be especially applicable to a nuclear turibne. The treatment of the high pressure and reheat signals thereafter is the same as before.

The described control system provides an optimum starting time or load increase or reduction time regardless of the immediately previous condition of the turbine and regardless of the variations in inlet steam conditions which might exist.

The method herein described can be carried out by a large number of equivalent control systems, either analog or digital in nature and using electrical, hydraulic, fluidic or pneumatic systems. The implementation of a suitable physical controller to carry out the function depicted in FIG. 1 will be apparent to one skilled in the control art. However, the depicted functions are also easily implemented in a special purpose or general purpose digital computer by well-known programming techniques.

While there is shown what is considered at present to be the preferred embodiment of the invention, it is of course understood that various other modifications may be made therein, and it is intended to cover in the appended claims all such modifications as fall within the true spirit and scope of the invention.

What is claimed and desired to secure by Letters Patent of the United States:

1. In a steam turbine control system having first and second turbines and a plurality of valves operable to admit steam to the first stage of the first turbine through nozzle arcs, the combination of:

load control means arranged to position said valves to admit a desired total steam flow to both of said turbines, admission mode transfer means arranged to adjust the relative openings among said valves to the nozzle arcs to effect changes in first stage temperature independently of total steam flow, means calculating first and second signals for the first and second turbines respectively which simulate allowable thermal stresses, said first signal being substantially responsive to setting of the mode transfer means and the second signal being substantially unresponsive thereto, means for adjusting the load control means to change load in accordance with the higher of the first and second signals, and means for adjusting the mode transfer means in accordance with the difference between the first and second signals so as to minimize said difference.

2. The combination according to claim 1, wherein said first and second signals simulate high pressure rotor stress and reheat rotor stress in high pressure and reheat turbines respectively of a steam turbine-generator powerplant.

3. The combination according to claim 2, wherein bore stress and surface stress calculations are performed for each of said rotors, and a maximum stress for each of said rotors is further selected by means comparing said bore stress and surface stress of the respective rotors, the maximum stress in said high pressure rotor serving as said first signal and the maximum stress in said reheat rotor serving as said second signal.

4. The combination according to claim 1, wherein said first signal simulates the higher of the rotor or casing allowable stress in the first turbine and wherein said second signal simulates the higher of the rotor or casing allowable stress in the second turbine.

5. The combination according to claim 1, wherein said admission mode transfer means includes a plurality of servos exercising concurrent control over a bypass valve connected upstream and in series flow with a plurality of control valves, each of the latter controlling steam flow to a separate nozzle arc of the steam turbine.

6. The combination according to claim 1, wherein said admission mode transfer means comprises a plurality of servos adapted to selectively position said plurality of control valves between a first admission mode of control valves operating in unison and a second admission mode of control valves operating in sequence.

7. A control system for changing load in a steam turbine powerplant of the type having flow through at least two turbines and also having provisions for transfer of admission mode between full arc and partial arc admission to the first turbine comprising:

means calculating first and second signals simulating stresses in said first and second turbines, the first signal being responsive to admission mode, means changing load on the turbine at a rate limited by the highest of said first and second signals, and means comparing said first and second signals and providing a difference signal, and mode transfer means responsive to said difference signal and arranged to adjust the turbine admission mode in a manner to minimize said difference signal.

References Cited
UNITED STATES PATENTS

| | | | |
|---|---|---|---|
| 3,241,322 | 3/1966 | Strohmeyer, Jr. | 60—73 |
| 3,097,489 | 7/1963 | Eggenberger et al | 60—105X |
| 3,340,883 | 9/1967 | Peternel | 415—17X |
| 3,446,224 | 5/1969 | Zwicky, Jr. | 415—17 |

MARTIN P. SCHWADRON, Primary Examiner

A. M. OSTRAGER, Assistant Examiner

U.S. Cl. X.R.

60—105